No. 819,902. PATENTED MAY 8, 1906.
W. C. MATTESON.
LOCK NUT.
APPLICATION FILED JULY 11, 1903.
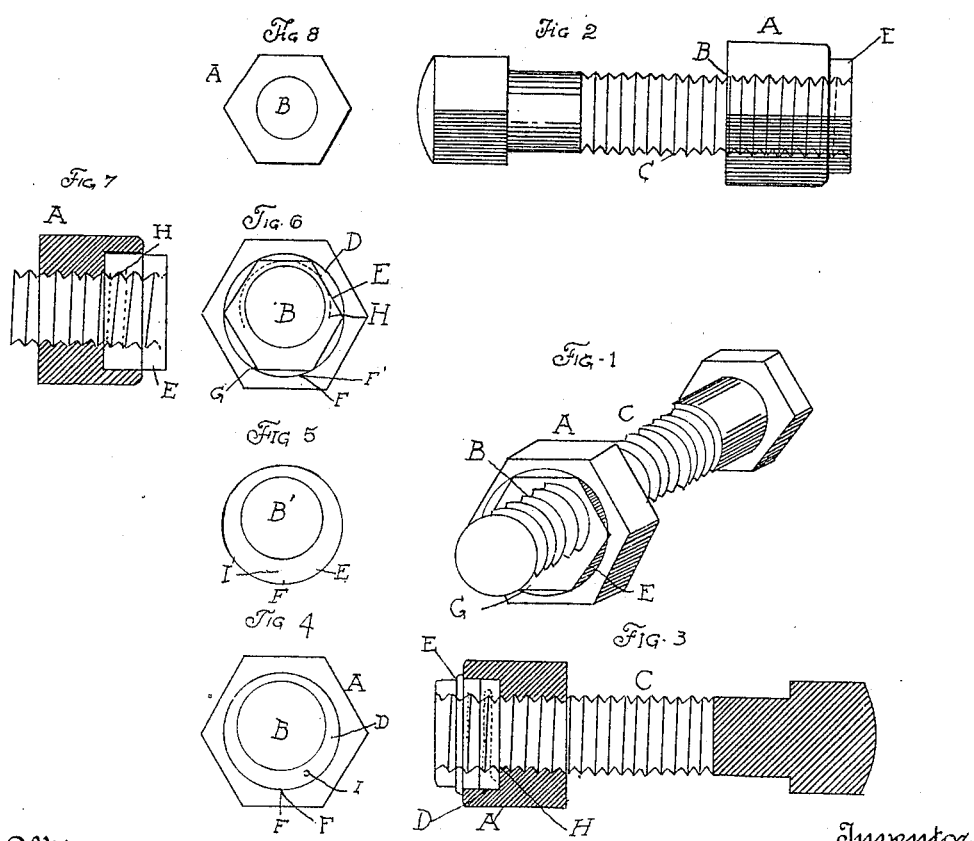
Witnesses
Wm Beasley
A Wardrobe
Inventor
Walter C. Matteson,
By Amos H. Carpenter.
Attorney

UNITED STATES PATENT OFFICE.

WALTER C. MATTESON, OF STOCKTON, CALIFORNIA, ASSIGNOR OF TWO-THIRDS TO EDWARD J. MATTESON AND A. H. CARPENTER, OF STOCKTON, CALIFORNIA.

LOCK-NUT.

No. 819,902.     Specification of Letters Patent.     Patented May 8, 1906.

Application filed July 11, 1903. Serial No. 165,114.

*To all whom it may concern:*

Be it known that I, WALTER C. MATTESON, a citizen of the United States, residing at Stockton, in the county of San Joaquin and State of California, have invented a new and useful Improvement in Lock-Nuts; and I declare that the following is a full, clear, and exact description of the invention, which will enable others skilled in the art to which it appertains to make and use the same, reference being had to the accompanying drawings, and to the letters of reference marked thereon, which form a part of this specification.

My invention relates to certain improvements in lock-nuts for bolts in which the locking is accomplished by means of an eccentric device located and operated in the nut.

The object of my improvement is to provide a nut that may be rigidly set or locked upon any ordinary bolt at any desired place with or without coming closely or otherwise in contact with a resisting or other surface and also a nut that is self-locking. This I accomplish by the use of the peculiar construction, novel combination, and adaptation of parts hereinafter described, and particularly pointed out in the claims hereunto annexed, reference being had to the accompanying drawings for a better comprehension thereof, in which—

Figure 1 is a perspective view of the nut applied to an ordinary bolt. Fig. 2 is a side view with irregular lines, showing bolt through nut. Fig. 3 is a sectional view of nut on a line drawn through its center, showing eccentric plate and spring in place. Fig. 4 is a view of the outer end of the nut detached from the bolt and eccentric plate, showing cylindrical opening B in nut and an end view of the eccentric counterbored recess D therein. Fig. 5 is a view of the inner or lower end of the eccentric plate E. Fig. 6 is a view of the outer end of the nut detached from the bolt with the eccentric plate in place in the counterbored recess D. Fig. 7 is a sectional view of the nut and eccentric plate, showing spring in place. Fig. 8 shows inner end of nut.

Similar letters of reference indicate corresponding parts in the several views.

My improvement consists, essentially, of the nut A, which may be made of any suitable material, through the center of which is a cylindrical opening B, which is screw-threaded, and thereby adapted to receive a screw-threaded bolt C. The outer end of the nut A is counterbored to a suitable depth, thereby making an internal smooth circular recess D, which is eccentric to the shank of the bolt C when placed in position in the opening B, which is adapted to receive loosely the smooth circular plate E, that is likewise made when received and placed in said recess D eccentric to the shank of the bolt and through which passes the screw-threaded opening B', adapted to receive the bolt C and to turn loosely thereon with said nut. Upon the outer or upper side of the plate E is a square pentagonal or other polygonal head or projection G, which is made a part thereof or rigidly attached thereto for the purpose of turning the same in the recess D by hand or any suitable wrench, and F' is a point in the periphery of said plate which is farthest distant from the center of the circular opening B', and F is a point in the circumference of the recess D of said nut which is also farthest distant from the center of its cylindrical opening B.

Between the circular eccentric plate E and the bottom of the recess D is a coil of steel wire or other suitable spring H, one end of which is turned downward at right angles and made to penetrate and fit a hole I in the inner surface or bottom of the counterbored recess D of the nut A, and the other end of said wire or spring is turned upward in the opposite direction to penetrate and fit a corresponding hole I' in the circular eccentric plate E. Each end of said wire or spring is rigidly fixed in its respective hole, which said holes may be located at any convenient place in nut and plate, provided the length of the spring is so adjusted as to throw or draw by its tension the cylindrical openings B and B' out of a common center when the plate is in place in the counterbored recess D, thereby locking the nut, as hereinafter explained. When the eccentric plate E is placed in the recess D, so that the designated point F' on its periphery is adjacent or contiguous to the designated point F in the circumference of the circular recess D which is farthest distant from the center of the cylindrical opening B in the nut A, the said circular opening B' in the plate E is concentric with the cylindrical opening B in the nut A, and the nut may then be easily screwed inward or outward on the bolt, as the nut is then unlocked. When the plate E is turned in the recess D in the direction the nut is turned when being screwed inward on the bolt and the point F' in the plate E passes to the right of the point F in the circumference of the recess D, so that said points are not contiguous or adjacent, the circular opening B' in said plate E ceases to be concentric with the cylindrical opening B in the nut A, and the nut is then locked by the frictional pressure or clamping of the bolt by the inside surfaces of the openings B and B' in the nut and plate, which is produced by the movement of the said openings from their common center in opposite directions. By turning the plate E in the recess D in the direction the nut is turned when being screwed outward or off the bolt and the point F' in the plate E passes to the left of the point F in the circumference of the recess D, so that said points are not contiguous or adjacent, the said openings B and B' again cease to be concentric with each other, and the nut is locked by the means above stated, so that it cannot be turned inward or on the bolt.

The plate E may be moved in the desired direction by hand or any suitable wrench and the nut locked without the use of the spring H, and the only purpose of the spring is to make the device self-locking and to keep the circular openings B and B' from being concentric and the nut from thereby becoming unlocked.

The drawings show a bolt, nut, and eccentric plate constructed with ordinary right-hand screw-threads; but said nut and plate may be used on bolts with left-hand screw-threads, and when so constructed the nut may be locked by turning the plate E in the opposite direction from which it is turned in right-hand threads, and the same results are thereby obtained as with right-hand threads. In case left-hand threads are used and it is desired to provide a spring to make the device self-locking the same kind of a spring may be used as in right-hand threads, except that the coil of the spring must be wound in the opposite direction from that taken in making a spring for right-hand threads in order to produce a movement of the plate E in the right direction.

What I claim, and desire to secure by Letters Patent, is—

1. A nut provided with a screw-threaded cylindrical opening for the reception of a screw-threaded bolt, a smooth counterbored recess made in its outer end eccentric to the shank of the bolt, a circular plate adapted to turn loosely therein and around said bolt eccentric to the shank of said bolt, with a square, pentagonal or other polygonal head projecting outward from the outer surface of the plate, and a spring the tension of which between its ends fastened respectively in nut and plate forces the plate in the desired direction so that its circular opening may not be concentric with the cylindrical opening in the nut, substantially as set forth.

2. The combination of a screw-threaded bolt, a nut provided with a cylindrical screw-threaded opening for the reception of the bolt, and with a counterbored recess made in its outer end eccentric to the shank of the bolt, a circular plate provided with a cylindrical screw-threaded opening to receive a screw-threaded bolt, and adapted to turn loosely on said bolt and in said recess eccentric to the shank of the bolt, with a square, pentagonal or other polygonal head projecting outward from the outer surface of the plate, and a spring the tension of which between its ends fastened respectively in the nut and plate forces the circular screw-threaded opening in said plate from being concentric with the cylindrical screw-threaded opening in the nut, substantially as set forth.

3. The combination in a lock-nut of the screw-threaded bolt C, the nut A provided with the screw-threaded opening B, the smooth cylindrical counterbored recess D eccentric to the shank of the bolt C, the smooth circular cylindrical plate E, with the screw-threaded opening B', eccentric to the shank of the bolt C, with the head G, the spring H the tension of which between its ends fastened respectively in the nut and plate forces the circular screw-threaded opening in said plate from being concentric with the cylindrical screw-threaded opening in nut, all arranged and operating substantially as shown and described and for the purposes set forth.

4. The combination in a lock-nut of the bolt C, the nut A, with the opening B, the cylindrical counterbored recess D, and the circular cylindrical plate E with the head G, the opening B', and the spring H the tension of which between its ends fastened respectively in the nut and plate forces the circular screw-threaded opening in said plate from being concentric with the cylindrical screw-threaded opening in nut, all arranged and operating substantially as shown and described and for the purposes set forth.

WALTER C. MATTESON.

Witnesses:
WEBSTER JACKSON,
B. McGORRAY.